(12) United States Patent
Takamatsu

(10) Patent No.: US 8,483,538 B2
(45) Date of Patent: Jul. 9, 2013

(54) PLUG HOUSING AND PLUG APPARATUS

(75) Inventor: Michihiro Takamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 536 days.

(21) Appl. No.: 12/731,666

(22) Filed: Mar. 25, 2010

(65) Prior Publication Data

US 2010/0247057 A1    Sep. 30, 2010

(30) Foreign Application Priority Data

Mar. 27, 2009   (JP) .................................. 2009-079069

(51) Int. Cl.
*G02B 6/00* (2006.01)
(52) U.S. Cl.
USPC .......................................... 385/139; 385/53
(58) Field of Classification Search
USPC .......................................... 385/135, 53, 139
See application file for complete search history.

(56) References Cited

U.S. PATENT DOCUMENTS

| 5,960,138 A | 9/1999 | Shimoji et al. |
| 6,017,153 A * | 1/2000 | Carlisle et al. .................. 385/56 |
| 6,196,733 B1 * | 3/2001 | Wild ............................... 385/86 |
| 6,932,514 B2 | 8/2005 | Anderson et al. |

FOREIGN PATENT DOCUMENTS

| JP | 10-307234 | 11/1998 |
| JP | 2001-141961 | 5/2001 |
| JP | 2004-226564 | 8/2004 |
| JP | 2004-226984 | 8/2004 |
| JP | 2007-233291 | 9/2007 |

* cited by examiner

*Primary Examiner* — Charlie Peng
*Assistant Examiner* — Peter Radkowski
(74) *Attorney, Agent, or Firm* — Squire Sanders (US) LLP

(57) ABSTRACT

A plug housing for accommodating a plug for connecting to the adapter, includes a housing body having an inside surface, the inside surface forming a through hole accommodating the main body of the plug, a slope portion formed on the inside surface and configured to cause the main body of the plug to move forward by a reaction force received from a second lever formed on the side surface of the plug when the main body of the plug is accommodated in the through hole and the second lever is pushed down by the slope portion, and a restrict portion formed on the inside surface and configured to restrict the forward movement of the main body of the plug.

8 Claims, 4 Drawing Sheets

PLUG HOUSING AND PLUG APPARATUS

CROSS-REFERENCE TO RELATED APPLICATION

This application is based upon and claims the benefit of priority of the prior Japanese Patent Application No. 2009-079069, filed on Mar. 27, 2009, the entire contents of which are incorporated herein by reference.

FIELD

The present embodiment relates to a plug housing and a plug apparatus.

BACKGROUND

An adaptor for connecting optical connectors and an optical connector having an arm are disclosed in, for example, Japanese Laid-Open Patent Publication Nos. 2001-141961 and 10-307234.

In such an adaptor, no axial play is set with respect to the optical connectors. For this reason, the distance between the optical connectors becomes too short according to production accuracies of the adapter and the optical connectors. This may cause an overload on ferrules that are to abut on each other. In contrast, when the distance between the optical connectors is too long, the connection loss between the ferrules sometimes increases.

SUMMARY

According to an aspect of the embodiments, a plug housing for accommodating a plug for connecting to the adapter, includes a housing body having an inside surface, the inside surface forming a through hole accommodating the main body of the plug, a slope portion formed on the inside surface and configured to cause the main body of the plug to move forward by a reaction force received from a second lever formed on the side surface of the plug when the main body of the plug is accommodated in the through hole and the second lever is pushed down by the slope portion, and a restrict portion formed on the inside surface and configured to restrict the forward movement of the main body of the plug.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An embodiment will be described below.

Figure 1A:
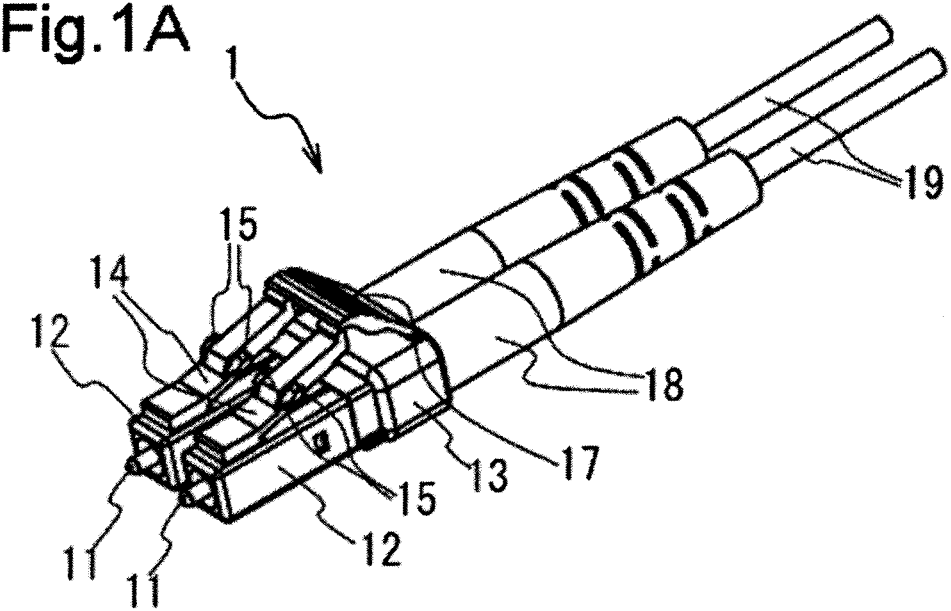
FIGS. 1A and 1B are explanatory views of an optical connector.
Figure 1B:
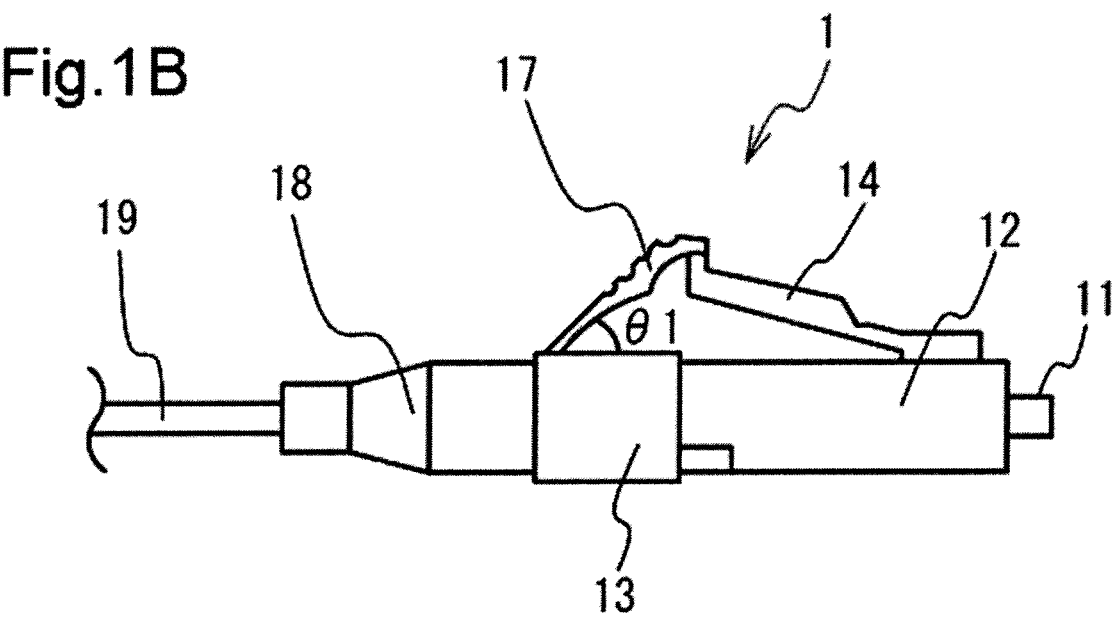

FIGS. 1A and 1B are explanatory views of an optical connector 1. FIG. 1B schematically shows a side face of the optical connector 1. The optical connector 1 is a dual LC optical connector. Ferrules 11 are respectively held by a pair of cylindrical portions 12, and respectively hold optical fibers. A holding portion 13 is provided at base ends of the cylindrical portions 12, and latch arms 14 are respectively provided on side faces of the cylindrical portions 12. An operation arm 17 is provided on a side face of the holding portion 13.

A pair of optical fiber cables 19 is led in the holding portion 13 via a pair of boots 18. The holding portion 13 holds the ferrules 11 together with the cylindrical portions 12. The latch arms 14 are provided on the cylindrical portions 12 in a manner such as to be elastically deformable, and extend toward an axial base end of the optical connector 1. The operation arm 17 is provided on the holding portion 13 in a manner such as to be elastically deformable, and extends toward an axial leading end of the optical connector 1. A leading end of the operation arm 17 presses leading ends of the latch arms 14. When the operation arm 17 is pushed, the latch arms 14 deform together with the operation arm 17 so as to follow the shapes of the cylindrical portions 12 and the holding portion 13. The latch arms 14 are respectively provided with engaging projections 15. The engaging projections 15 are normally engaged with engaging holes provided in an adapter in which the optical connector 1 is to be inserted, so that the portion of the optical connector 1 with respect to the adapter is determined. In FIG. 1B, θ1 represents the inclination angle of the operation arm 17 with respect to the holding portion 13 in a natural state.

Figure 2A:
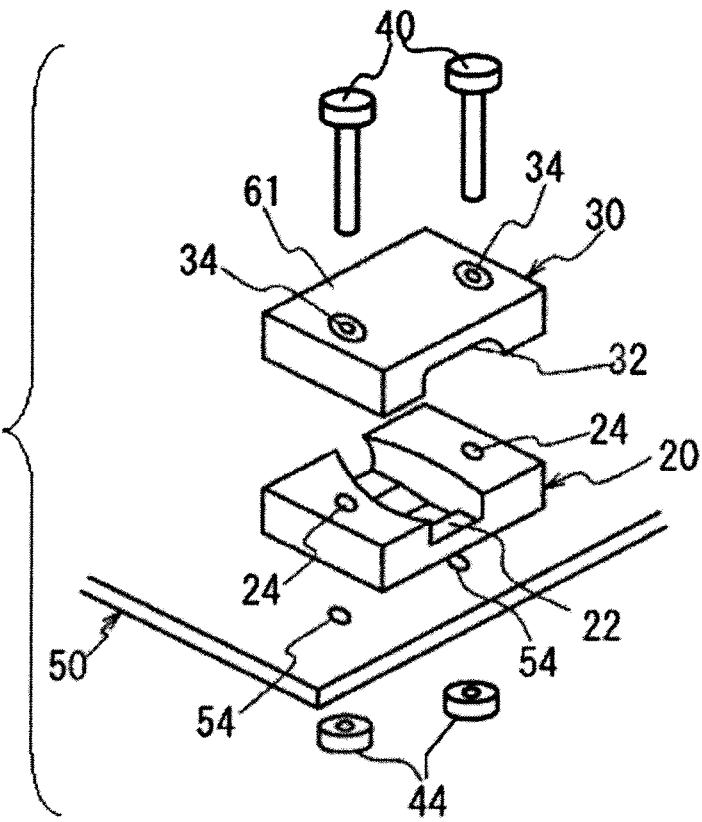
FIGS. 2A to 2C are explanatory views of a housing.

Next, a housing 2 will be described with reference to FIGS. 2A to 2C. As shown in FIG. 2A, the housing 2 includes cases 20 and 30. The cases 20 and 30 correspond to a housing body, and are formed of, for example, synthetic resin. The housing 2 is fixed to a printed board 50. More specifically, the cases 20 and 30 respectively have holes 24 and 34, the printed board 50 has holes 54, and screws 40 are inserted in the holes 24, 34, and 54. The cases 20 and 30 are fixed to the printed board 50 by the screws 40 and nuts 44. Further, the cases 20 and 30 respectively have concave accommodating portions 22 and 32 for accommodating and holding the optical connector 1.

Figure 2B:
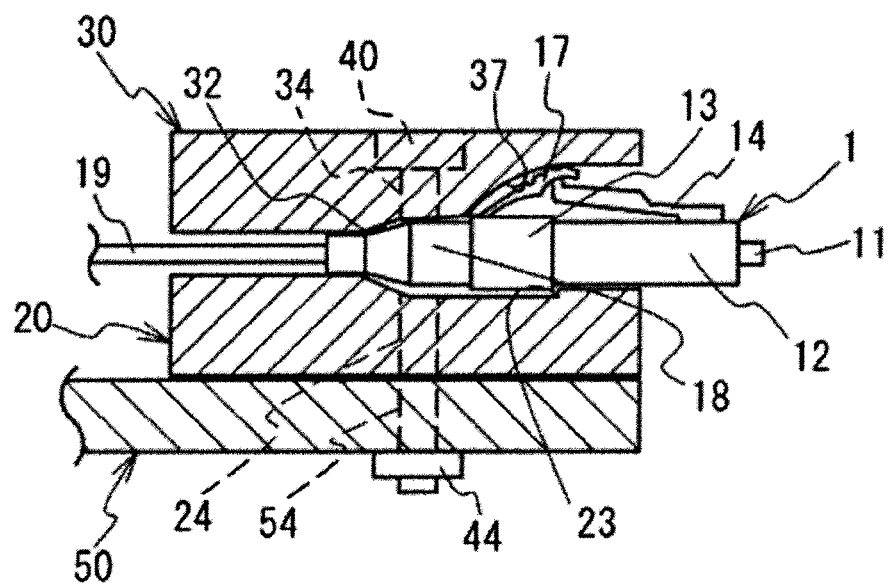
Figure 2C:
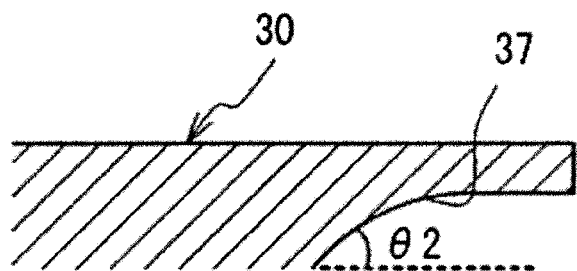

FIG. 2B shows a cross section of the housing 2 that holds the optical connector 1. The optical connector 1 is accommodated in the accommodating portions 22 and 32. Leading ends of the ferrules 11 protrude from the accommodating portions 22 and 32. In a state in which the optical connector 1 is accommodated in the accommodating portions 22 and 32, the operation arm 17 and the latch arms 14 are pressed. More specifically, a pressing surface 37 provided on the accommodating portion 32 presses the operation arm 17 toward the holding portion 13 and the cylindrical portions 12. FIG. 2C is an enlarged view of the pressing surface 37. A ridge line of the pressing surface 37 is shaped like a gentle arc that is convex upward. The distance from a horizontal plane parallel to the printed board 50 to the pressing surface 37 decreases from the front side to the rear side in the axial direction. In other words, the pressing surface 37 is inclined in a manner such that a space defined in the accommodating portions 22 and 32 decreases from the front side to the rear side in the axial direction. The maximum angle θ2 of the pressing surface 37 with respect to the horizontal plane is smaller than the angle θ1 of the operation arm 17 in the natural state. Hence, the angle of the operation arm 17 is smaller than θ1 in a state in which the optical connector 1 is held by the housing 2. Thus, the operation arm 17 and the latch arms 14 attempt to return to their original portions by elastic restoring forces. The elastic restoring forces by which the operation arm 17 and the latch arms 14 attempt to return to their original portions move the optical connector 1 forward in the axial direction relative to the housing 2.

As described above, the pressing surface 37 is inclined in a manner such that the space in the accommodating portion 32 decreases from the front side to the rear side in the axial direction. For this reason, when the optical connector 1 moves rearward in the axial direction while being held in the housing 2, the operation arm 17 is pressed by the pressing surface 37, whereby the elastic restoring forces of the operation arm 17 and the latch arms 14 increase. As described above, the elastic restoring forces act so that the optical connector 1 moves forward in the axial direction relative to the housing 2. Hence, the more the optical connector 1 moves rearward in the axial direction relative to the housing 2, the more the elastic restoring forces of the operation arm 17 and the latch arms 14 become, so that the optical connector 1 attempts to move forward in the axial direction.

As shown in FIG. 2B, the case 20 is provided with a contact portion 23. The contact portion 23 restricts the axial forward movement of the optical connector 1 by contact with an end of the holding portion 13. However, the contact portion 23 does not have a function of restricting the axial rearward movement of the optical connector 1. In a state in which the optical connector 1 is held by the housing 2, it is moved by the elastic restoring forces of the operation arm 17 and the latch arms 14 to a portion where the holding portion 13 comes into contact with the contact portion 23, whereby the portion of the optical connector 1 with respect to the housing 2 is determined.

As described above, play that allows axial movement of the optical connector 1 is set in the housing 2. For example, when the optical connector 1 held by the housing 2 is connected to the other optical connector, the ferrules 11 of the optical connector 1 are brought into contact with ferrules of the other optical connector. In this case, the optical connector 1 is allowed to move in the axial direction relative to the housing 2, more specifically, rearward in the axial direction. This avoids an overload on the ferrules.

If the axial play between the connected optical connectors is too large, rattling in the axial direction occurs there between, which may increase the connection loss between the ferrules. However, since the optical connector 1 attempts to move forward in the axial direction because of the elastic restoring forces of the operation arm 17 and the latch arms 14, as described above, the axial play between the optical connectors is absorbed, and the connection loss is suppressed thereby.

Figure 3A:
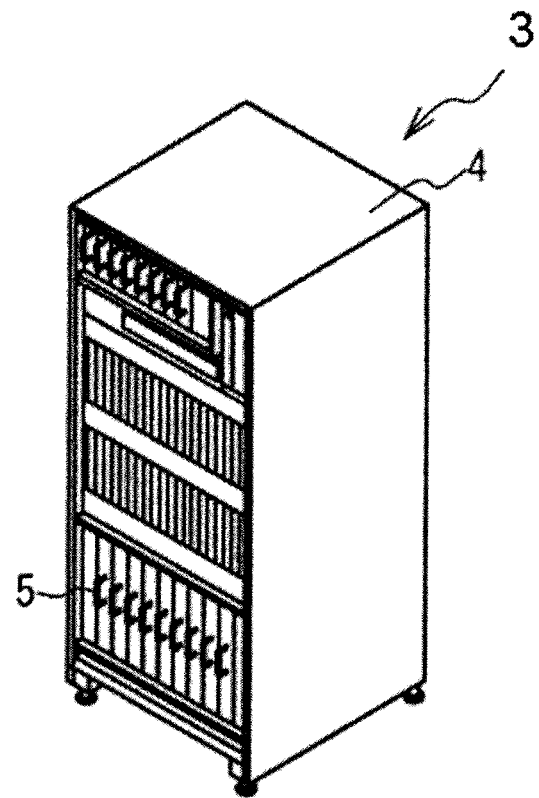
FIGS. 3A and 3B are explanatory views of an electronic device including the housing.
Figure 3B:
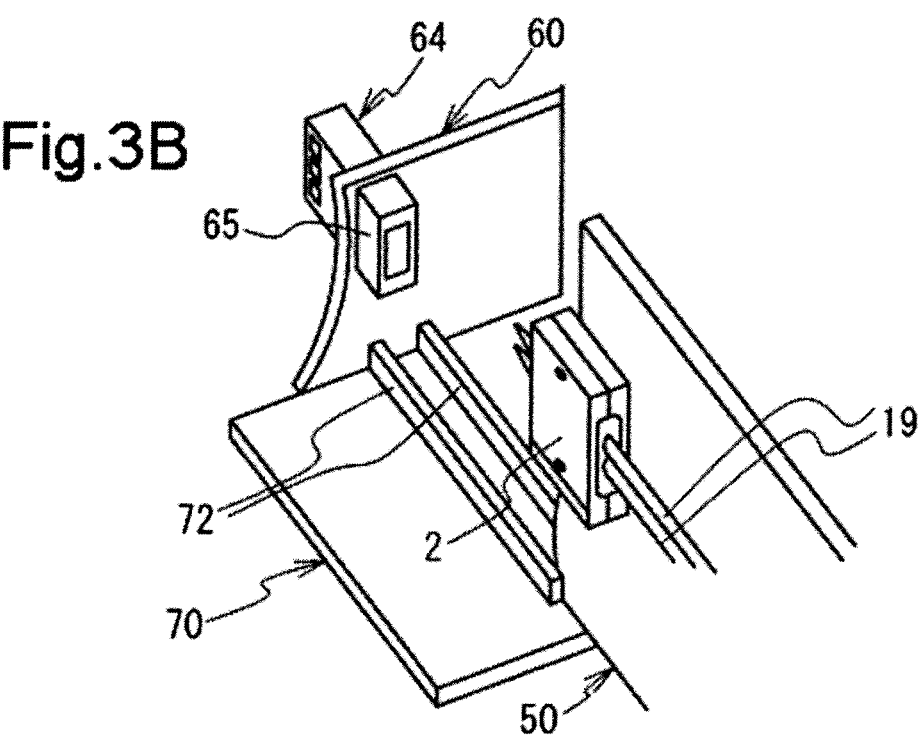

A description will now be given of an electronic device that adopts a printed board 50 on which the above-described housing 2 is mounted. FIGS. 3A and 3B are explanatory views of an electronic device having housing. FIG. 3A schematically shows a rack mount apparatus in which electronic devices are mounted. Referring to FIG. 3A, a rack mount apparatus 3, such as a server apparatus, includes a casing 4 and a plurality of electronic devices 5 stored in the casing 4. The electronic devices 5 can be inserted into and removed from the casing 4. A printed board 50 on which a housing 2 is mounted is adopted in each of the electronic devices 5.

FIG. 3B shows a connecting method for an optical connector. In the rack mount apparatus 3, a backplane 60 is provided, and an adapter 64 is mounted on the backplane 60. The adapter 64 has, at one end; an opening 65 in which a leading end of an optical connector 1 held by the housing 2 can be inserted. Further, the other optical connector is inserted in the other end of the adapter 64. A side of the one end of the adopter 64 is where the electronic device 5 is inserted, and a side of the other side of the adapter 64 is a back side of the rack mount apparatus 3.

In the rack mount apparatus 3, a printed board 70 having guide rails 72 is also provided. Along the guide rails 72, the printed board 50 is inserted, so that the optical connector 1 is inserted in the opening 65. Also, when the other optical connector is inserted in the adapter 64, it is connected to the optical connector 1.

Figure 4A:
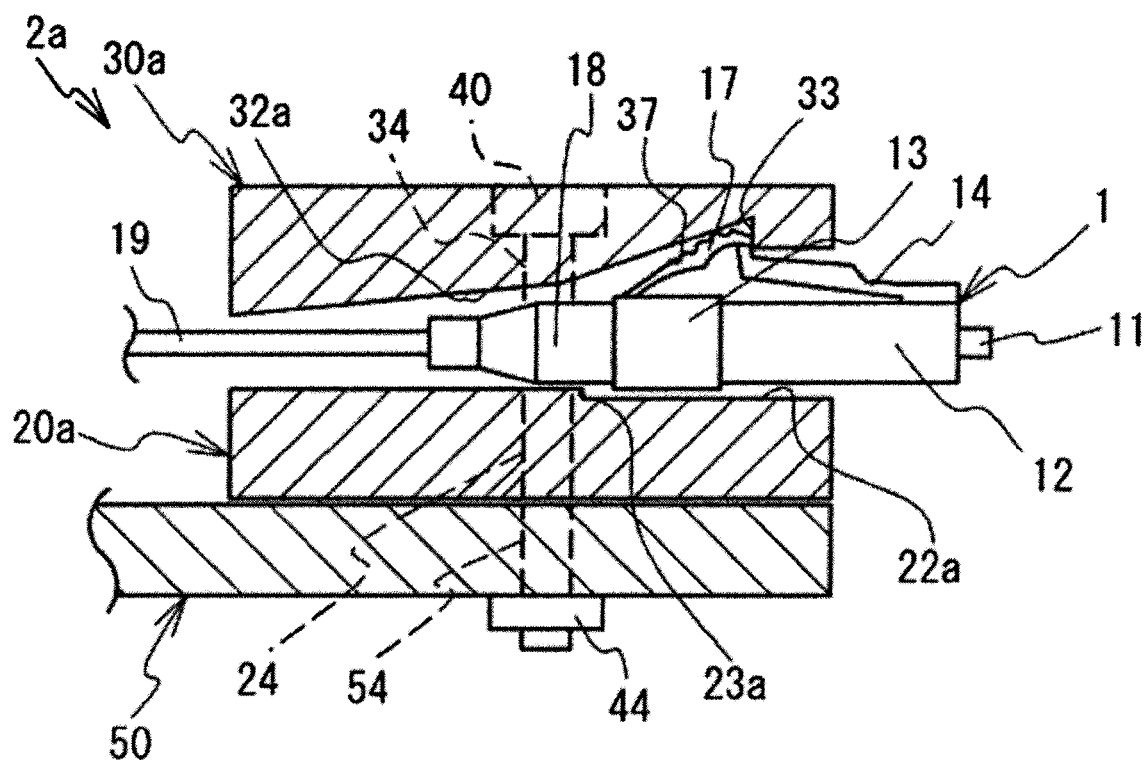
FIGS. 4A and 4B are explanatory views of housing according to a modification.
Figure 4B:
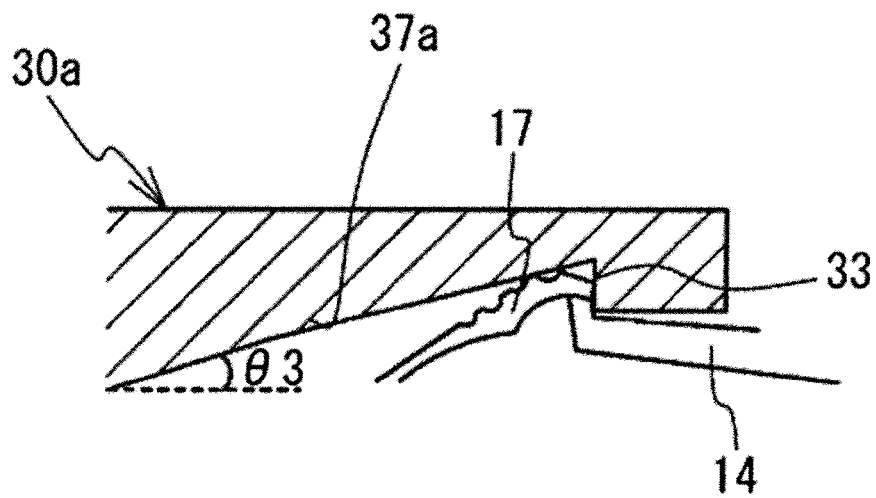

Next, a modification of housing will be described. FIGS. 4A and 4B are explanatory views of a housing of the modification. FIG. 4A corresponds to FIG. 2B. As shown in FIG. 4A, an accommodating portion 32a of a case 30a has a substantially linear pressing surface 37a. An angle θ3 formed between the pressing surface 37a and a horizontal plane is smaller than an angle θ1 of an operation arm 17 with respect to a holding portion 13. The case 30a also has a contact portion 33 that restricts axial forward movement of an optical connector 1. The contact portion 33 is to be in contact with a leading end of the operation arm 17. An accommodating portion 22a of a case 20a has a contact portion 23a that restricts axial rearward movement of the optical connector 1. The contact portion 23a is to be in contact with a base end of the holding portion 13.

Such a contact portion for restricting the axial forward movement of the optical connector 1 may be provided in the case 30a. In this way, the acceptable moving range in the axial direction of the optical connector 1 is defined by the contact portions 23a and 33.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A plug housing for accommodating a plug for connecting to an adapter, the plug including a main body having a plurality of side surfaces and a front surface, the plug further including a first lever and a second lever placed over one of the side surfaces, the first lever at its one end being in contact with the one of the side surfaces and extending away from the front surface toward the other end, the second lever at its one end being hinged to the one of the side surfaces, extending toward the front surface and having the other end engaged with the other end of the first lever, the other ends of the first and second levers staying away from one of the side surfaces when no force is applied there to and being resiliently movable when a force is applied downwardly toward the one of the side surfaces, the housing comprising:

a housing body having an inside surface, the inside surface forming a through hole accommodating the main body of the plug;

a slope portion formed on the inside surface and configured to cause the main body of the plug to move forward by a reaction force received from the second lever when the main body of the plug is accommodated in the through hole and the second lever is pushed down by the slope portion; and a restrict portion formed on the inside surface and configured to restrict the forward movement of the main body of the plug, wherein $\theta_1$ represents an inclination angle of the second lever with respect to the one of the side surfaces in a natural state, $\theta_2$ represents a maximum angle of the slope portion with respect to a horizontal plane, and $\theta_1$ is larger than $\theta_2$.

2. The plug housing according to claim 1, wherein the main body of the plug further comprises a projection; and the restrict portion is engageable with the projection of the plug.

3. The plug housing according to claim 1, wherein the restrict portion is engageable with end of the second lever of the plug.

4. The plug housing according to claim 1, wherein the plug is an optical plug and the adapter is an optical plug adapter.

5. A plug apparatus comprising:

a plug comprising:

a main body having a plurality of side surfaces and a front surface, the plug further including a first lever and a second lever placed over one of the side surfaces, the first lever at its one end being in contact with the one of the side surfaces and extending away from the front surface toward the other end, the second lever at its one end being hinged to the one of the side surfaces, extending toward the front surface and having the other end engaged with the other end of the first lever, the other ends of the first and second levers staying away from one of the side surfaces when no force is applied there to and being resiliently movable when a force is applied downwardly toward the one of the side surface; and a plug housing comprising:

a housing body having an inside surface, the inside surface forming a through hole accommodating the main body of the plug;

a slope portion formed on the inside surface and configured to cause the main body of the plug to move forward by a reaction force received from the second lever when the main body of the plug is accommodated in the through hole and the second lever is pushed down by the slope portion; and a restrict portion formed on the inside surface and configured to restrict the forward movement of the main body of the plug, wherein $\theta_1$ represents an inclination angle of the second lever with respect to the one of the side surfaces in a natural state, $\theta_2$ represents a maximum angle of the slope portion with respect to a horizontal plane, and $\theta_1$ is larger than $\theta_2$.

6. The plug apparatus according to claim 5, wherein the main body of the plug further comprises a projection; and the restrict portion is engageable with the projection of the plug.

7. The plug apparatus according to claim 5, wherein the restrict portion is engageable with end of the second lever of the plug.

8. The plug apparatus according to claim 5, wherein the plug is an optical plug and the adapter is an optical plug adapter.

* * * * *